3,476,805
ADIPIC ACID RECOVERY FROM NITRIC ACID
OXIDATION
Heinz Vollinger, Dortelweil, Kurt Pohl, Offenbach (Main), and Friedrich Bende, Bergen-Enkheim, Germany, assignors to Vickers-Zimmer Aktiengesellschaft Planung und Bau von Industrieanlagen, a corporation of Germany
Filed June 14, 1966, Ser. No. 557,407
Int. Cl. C07c 51/42, 55/04, 55/14
U.S. Cl. 260—531     3 Claims

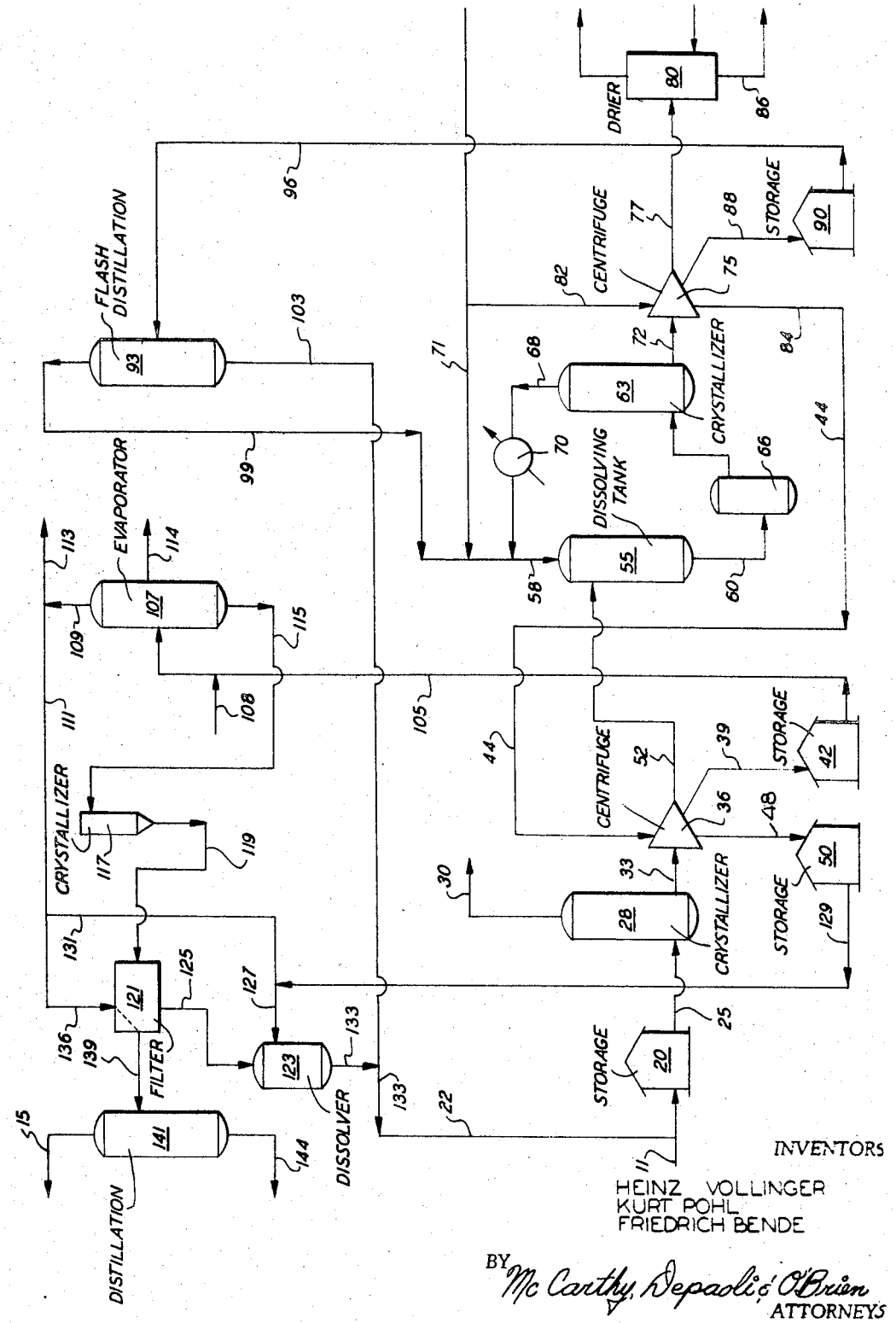

ABSTRACT OF THE DISCLOSURE

Method of recovery of adipic acid from a product stream of a reaction mixture wherein a mixture of cyclohexanol and cyclohexanone is oxidized with a concentrated nitric acid solution, the product stream containing about 12–18 weight percent adipic acid and from 70–90 percent of the concentrated nitric acid oxidant, the steps including diluting the product stream to a nitric acid concentration of about 38% by weight, crystallizing in a first crystallizer to obtain coarse crystals of adipic acid under a vacuum at a temperature of about 35° C., centrifuging the coarse crystals to provide a crystal cake and a nitric acid mother liquor, separating the crystal cake and mother liquor, concentrating the mother liquor by evaporation of volatiles, passing the concentrated mother liquor to a crystallizer, cooling and then filtering to produce additional adipic acid crystals, redissolving the additional adipic acid crystals in water, recycling the redissolved adipic acid to the product stream and distilling the filtrate from the crystallizer to produce a nitric acid aqueous mixture.

---

This invention is concerned with the recovery of nitric acid from an adipic acid crystallization feedstock. Particular problems are involved in the recovery of nitric acid from a process wherein adipic acid is produced. In such a process, partially oxidized $C_6$ hydrocarbon precursors, usually contained in a mixture of cyclohexanol and cyclohexanone, are contacted intimately with an aqueous nitric acid reagent under defined conditions of temperature, pressure and residence time. It has been found that temperature of the range of about 40–90° C., preferably 60–80° C. and pressures sufficient to maintain the liquid phase give efficient results in the amount of conversion of the precursor mixture (anolone) and in the selectivity of the conversion to adipic acid. See U.S. Patent 2,703,331. The most favored concentration of the nitric acid feed to this reaction is about 60%, while the reaction product contains water and nitric acid in amounts equivalent to about 25–50% nitric acid.

The product of the oxidation reaction contains adipic acid in a small amount, along with a number of unreacted starting materials and by-products. From a typical nitric acid oxidation reaction, the liquid product may contain about 4.5 or more mole percent adipic acid along with about 0.01 the mole percent glutaric, succinic, oxalic acid and other by-products, as well as nitric acid and 50–70% water. In addition, a gaseous product comprising mostly nitrous oxides are produced, which also contain nitrogen, carbon dioxide, etc.

This invention provides procedures by which nitric acid may be reconcentrated to the desired 60% strength for reuse in the oxidation step with little loss of the nitric acid and with removal of undesired by-products from the system, while still recovering adipic acid from the reaction mixture in a substantially pure state, whereby it may be readily employed in typical uses of this dibasic acid, including, uses which demand, high purity, for example, as a polymerization feedstock in nylon production or as an intermediate in the production of hexamethylenediamine, the other monomer component for nylon production.

The art has devoted considerable attention to the recovery of pure adipic acid from the above described reaction product; the methods previously proposed have, in general, sought to recover adipic acid from the reaction product by concentrating the solution to a point where it is supersaturated with regard to adipic acid. The adipic acid crystallizes out from this mixture and the crystals are recovered, perhaps after a recrystallization from water. In addition, the mother liquor from the supersaturated solution is usually treated for further crystallization of adipic acid and recovery thereof. It was found that when an oxidation product stream is regulated to contain about 70–90% of the nitric acid concentration originally contained in the oxidation product stream it may be vacuum crystallized at about 35° C. to produce coarse crystals of adipic acid which may be removed from mother liquor by centrifugation without a need for complicated and expensive filtration procedures. This crystal product may be redissolved in distilled water and subjected to recrystallization at about 52° C. and again centrifuged at about this temperature to produce adipic acid crystals in good yield and of a purity sufficient for immediate drying and passage to adiponitrile or polyamide polymer production. This discovery forms part of the basis of copending application Ser. No. 557,539, filed June 14, 1966. In the present invention, mother liquor from the first crystallization, containing nitric acid, by-product and catalyst components is concentrated by water removal as by evaporation to produce a residue containing about 60% nitric acid based on nitric acid and water. This concentration also produces about 20% aqueous nitric acid fraction which can be concentrated or used in other applications. The concentrated mother liquor is crystallized and filtered to recover remaining adipic acid values and the filtrate is distilled to produce nitric acid of about 60% concentration and a residue containing the by-products and catalyst portions which may be passed to waste. Little nitric acid passes to waste with these materials.

The process of the instant invention also includes procedures designed for maximum water recovery. For example, the mother liquor obtained in the second adipic acid crystallization is distilled to provide a water recycle for redissolving the adipic acid first crystal cake and to provide a residue containing water and adipic acid values which, when added to the oxidation reaction product stream, serves both to recover adipic acid and to dilute the product stream from the usually 25–50% nitric acid concentration to 70–90% of the nitric acid concentration originally in the oxidation product stream desired for proper crystallization of the adipic acid in the product stream.

This invention will be better understood by reference to the accompanying drawing, the sole figure of which is a flow sheet illustrating the novel techniques of this invention.

In the drawings, a line 11 carries reaction product from a zone in which anolone (a mixture of cyclohexanol and cyclohexanone) is contacted with a solution of nitric acid from line 15 to produce adipic acid. The aqueous nitric acid has a concentration of about 60% $HNO_3$. The reaction product contains about 44% nitric acid along with water, adipic acid, some unreacted starting material, by-products and dissolved catalyst. This reaction product is led by line 11 to storage tank 20. Sufficient water is supplied to the tank 20 by line 22 to give the stored product a concentration of about 38% $HNO_3$.

The stored mixture is conducted by line 25, to the first crystallizer 28. The mixture can pass through line 25 at a temperature of about 75° C. Crystals containing adipic acid and other materials are formed in the crystallizer 28 by lowering the temperature of the mixture to about 35° C. under vacuum produced in the line 30. Line 30 also serves to remove nitric acid decomposition vapors from the crystallizer 28 and these vapors may be condensed and used for neutralization of waste caustic effluents in the system if desired.

The slurry of coarse, crude adipic acid in nitric acid and water is passed by line 33 to centrifuge 36. This centrifuge preferably has a coarse screen suitable for handling a large flow of liquid. The mother liquor which passes through the screen goes by line 39 to storage tank 42. Water from line 44 is used to wash the coarse, crude adipic acid and this wash water passes by line 48 to storage tank 50. The crystals, after washing, pass by line 52 to the redissolver tank 55. Thus the adipic acid is freed of its mixture with nitric acid.

The redissolver tank 55 is supplied with pure water from line 58 and also may be steam jacketed to bring the contents to a temperature of about 80° C. The solution of adipic and other organic acids in water is conveyed by line 60 to a second crystallizer 63 which may be maintained at a temperature, say, of about 52° C. to insure crystallization of the adipic acid free from other components. Purification means, for example, the bed of charcoal 66 may be inserted in line 60 if desired. Water vapor passing upward through line 68 from the crystallizer 63 may be condensed by passage through heat exchanger 70 and the condensate water returned to the redissolver 55 by line 58. Line 71 may be employed to bring additional, make-up, demineralized water to the line 58 for redissolving.

The adipic acid crystal slurry from crystallizer 63 is conveyed by line 72 to the second centrifuge 75, which operates at a temperature of about 52° C. Adipic acid crystals from this centrifuge are sent by line 77 to drier 80 after being washed by water from line 82 which exits the centrifuge by line 84 for passage as wash water to the first centrifuge 36 by line 44. Dried adipic acid crystal product is removed from the system at 86.

The mother liquor from centrifuge 75 passes by line 88 to storage tank 90. This mother liquor which consists mainly of water but has a significant adipic acid content, may be sent to still 93 by line 96. Distilled water passes by lines 99 and 58 to the dissolving tank 55. Undistilled residue is sent by line 103 to line 22 for adjustment of the water content of the reaction product in storage tank 20 and for recovery of adipic acid.

The mixture in storage tank 42 which consists of water, nitric acid, a small amount of adipic acid, unwanted by-products and catalyst is further processed by conveying it through line 105 to the evaporating column 107 where by evaporation there is produced a residue containing about 60% nitric acid based on nitric acid and water. In this column steam may be used for heating to about 70° C. The column is held under a vacuum so that the pressure at the bottom of the column is about 115 mm. Hg pressure absolute while the top of the column has a pressure of about 85 mm. Hg pressure absolute and a temperature of about 50° C. Line 108 conducts to line 105 and evaporator 107 make up nitric acid in the form of a relatively dilute aqueous solution. Water vapor is removed at the top by line 109 and is condensed. A portion of this condensed water is passed to line 111 while the major portion is removed from the system by line 113. If desired, the evaporator may be tapped, as by line 114 to remove a 20% nitric acid solution for other use, if desired.

The bottoms from the evaporator 107 which is a concentrated solution of nitric acid containing adipic acid, by-products, etc., is passed by line 115 to the crystallizer 117. This chamber is held at a temperature of about 10° C., causing crystallization of remaining adipic acid and the resulting slurry of adipic acid crystals in concentrated nitric acid is sent by line 119 to filter 121. The adipic acid cake from this filtration is sent to redissolving tank 123 by line 125 and it is slurried and dissolved in water from line 127. As can be seen, this water is drawn from tank 50 by line 129 and from line 111 by line 131. The resulting adipic acid solution passes by way of line 133 to line 22 and storage tank 20.

By redissolving of the recovered adipic acid crystals in water instead of feeding them back directly to the crystallizer 28 better crystallization conditions are achieved, firstly because the difference between the densities of the crystals and the mother liquor becomes bigger and secondly because the amount of crystal nuclei is minimized and thus give the minimized number of crystals more chance of growing larger.

Filter cake in filter 121 may be washed with water from line 136 drawn from line 111 and this wash water, along with filtrate from the filter 121 passes by line 139 to the distillation column 141. That column has a top maintained at about 85 mm. Hg and 62° C. while the bottom is at 95 mm. Hg and 100° C. Concentrated nitric acid passes out the top of the column 141 by way of line 15 to reuse in the oxidation process, this nitric acid being of a concentration and purity suitable for passage back to the reactor. Residue containing by-products and catalyst is removed from the nitric acid column 141 by line 144. This conveniently is sent to waste.

The following example illustrates the method of this invention but should not be considered limiting. A reactor wherein anolone is contacted with a 60% nitric acid solution at about 75° C. in the presence of small catalytic amount of copper, iron and vanadate produces about 21,951 kg./hr. of an oxidation product stream in which the concentration of nitric acid (based on $HNO_3$ and water) is about 45.1%. The amount of material passing through line 11 is given in detail in the table below. The reactor is purged continually with air for agitation and removal of off-gases. The reaction product is conducted to a storage tank along with 3338 kg. per hr. of an aqueous adipic acid solution obtained in later nitric acid recovery and 1814 kg. per hr. of a bottoms fraction recovered from concentration of the second stage crystallization mother liquor. These materials pass through line 22 to storage. 27,103 kg. per hour of mixture, as detailed in the table below, passes to the first stage crystallizer 28 by line 25. The nitric acid concentration is about 38.2%.

The mixture reaches the crystallizer at a temperature of about 90° C. and during its passage through the crystallizer its temperature is reduced to about 35° C. The crystallizer is connected to a vacuum source which removes 1815 kg./hr. of vapors. Crystal slurry is drawn off from the crystallizer at 35° C. and is fed to a centrifuge which separates out about 20,363 kg. of mother liquor per hour. The centrifuge is a screen centrifuge having openings of about 0.1 micron. The centrifuge discharges about 4925 kg. per hour of crystals which have been washed in 1785 kg. per hour of wash water from the second centrifuge.

The centrifuged crystals are redissolved in a tank which is supplied with 5385 kg. per hr. of pure water of which 1360 kg. is condensed from second crystallizer 63 vapor effluent, 2805 kg. is condensed from the overhead of concentrating the second stage crystallizer mother liquor, and 1220 kg./hr. is demineralized make-up water. The temperature of the water streams is such as to produce a temperature of about 80° C. in the redissolver tank. The redissolver tank supplies 10,310 kg. per hr. of solution to the second stage crystallizer at a temperature of about 80° C. The make-up of this solution is given in the table (line 60). As mentioned, 1380 kg. per hr. of water is vaporized from the crystallizer and returned to the dissolving tank. The remaining 8930 kg./hr., in the form of a crystal slurry, is passed to the second centrifuge at 52° C. to produce 4246 kg./hr. of a wet adipic acid filter cake. This cake is dried in a forced-air oven to yield 3820 kg./hr. of dry adipic acid crystals.

1700 kg./hr. of fresh demineralized water are used to wash the filter cake in the second centrifuge, producing 1785 kg./hr. of wash water solution which is used to wash the first adipic acid filter cake. The mother liquor from the second centrifuge amounts to about 4619 kg./hr. Distillation of this mother liquor provides 1814 kg./hr. of residue which is returned to the oxidation product storage and 2805 kg./hr. of pure water distillate which is sent to the dissolving tank.

As mentioned previously, 20,363 kg./hr. of nitric acid mother liquor from the first centrifuge passes to the evaporator. 1769 kg./hr. of a 35% nitric acid solution can be added to the evaporator as make-up. From the top of the evaporator, 6409 kg./hr. of almost pure water are drawn and of this 5317 kg./hr. is suitably sent to other uses or to waste. 850 kg./hr. of 20% nitric acid is tapped from the side of the evaporator and the residue from the bottom of the evaporator amounts to 14,873 kg./hr. of a solution described in the table at line 115.

This solution is crystallized by cooling and filtering to give 962 kg./hr. of filter cake, containing mostly adipic acid, (see line 125 in the table) which is redissolved in 591 kg./hr. of almost-pure water from the top of the evaporator and 175 kg./hr. of wash water from the first centrifuge and is returned to storage with the oxidation product mixture.

By application of the redissolving step as described herein the difference between the densities of the crystals and the mother liquor in crystallizer 28 is 0.13 g./cc. compared with 0.06 g./cc. had not the adipic acid been redissolved in water. The amount of crystal nuclei which would have been introduced undissolved in the second case would have been 15.3% of the total adipic acid discharged from the crystallizer 28.

The filtrate from filter 121, combined with the wash water drawn from line 136 amounts to 14,412 kg./hr. of mostly nitric acid. It also contains the by-products and catalyst and a little adipic acid. This solution is distilled in column 141 to produce 13,503 kg./hr. of 60% nitric acid overhead for the anolone oxidation reaction and 909 kg./hr. of residue which is sent to waste. The following table describes the composition of this residue as well as of the other solutions mentioned above.

TABLE—MATERIALS IN LINES (KG./HR.)

| Line | Total | Water | Nitric Acid | Adipic Acid | By-Products | Catalyst |
|---|---|---|---|---|---|---|
| 11 | 21,951 | 9,710 | 7,976 | 3,949 | 231 | 85 |
| 103 | 1,814 | 1,290 | 10 | 514 | | |
| 22 | 5,152 | 3,530 | 208 | 1,314 | | |
| 25 | 27,103 | 13,240 | 8,184 | 5,363 | 231 | 85 |
| 30 | 1,815 | 1,760 | 55 | | | |
| 39 and 105 | 20,363 | 11,177 | 7,927 | 943 | 231 | 85 |
| 52 | 4,925 | 495 | 10 | 4,420 | | |
| 44 and 84 | 1,785 | 1,700 | | 85 | | |
| 60 | 10,310 | 5,880 | 10 | 4,420 | | |
| 77 | 4,246 | 425 | | 3,821 | | |
| 88 and 96 | 4,619 | 4,095 | 10 | 514 | | |
| 108 | 1,769 | 1,131 | 638 | | | |
| 109 | 6,409 | 6,399 | 10 | | | |
| 113 | 5,317 | 5,309 | 8 | | | |
| 114 | 850 | 680 | 170 | | | |
| 115 | 14,873 | 5,229 | 8,385 | 943 | 231 | 85 |
| 125 | 962 | 142 | 5 | 815 | | |
| 131 | 591 | 590 | 1 | | | |
| 129 | 1,785 | 1,508 | 192 | 85 | | |
| 133 | 3,338 | 2,240 | 198 | 900 | | |
| 139 | 14,412 | 5,887 | 8,381 | 128 | 231 | 85 |
| 15 | 13,503 | 5,401 | 8,102 | | | |
| 144 | 909 | 186 | 279 | 128 | 231 | 85 |

It can thus be seen that this invention provides a technique for recovering a concentrated nitric acid solution from a nitric acid-containing oxidation effluent and the like while assuring good recovery of the desired oxidation product and minimizing water waste.

What is claimed is:
1. In a continuous method for the recovery of adipic acid from a product stream of a reaction mixture wherein a mixture of cyclohexanol and cyclohexanone is continuously oxidized with concentrated nitric acid solution, said product stream containing about 12–18 weight percent adipic acid and from 70–90 percent of the concentrated nitric acid oxidant, the improvement which comprises diluting said product stream to a nitric acid concentration of about 38 percent by weight, by the addition of recycled aqueous adipic acid solution and a bottoms fraction recovered from the later concentration of a nitric acid-containing mother liquor, crystallizing in a first crystallizer stage to obtain coarse crystals of adipic acid from said diluted product stream under a vacuum at a temperature of about 35° C., centrifuging the coarse crystals of adipic acid to provide a crystal cake and a nitric acid mother liquor, separating said crystal cake and said mother liquor, concentrating said mother liquor by evaporation of volatiles, passing said concentrated mother liquor to a crystallizer, cooling and filtering the same to produce additional adipic acid crystals, redissolving said additional adipic acid crystals in water, recycling said redissolved adipic acid to said product stream, and distilling the filtrate from said crystallizer to produce a nitric acid aqueous mixture.

2. A method according to claim 1 wherein said mixture of cyclohexanol and cyclohexanone is oxidized with aqueous nitric acid of about 60% concentration to yield a product stream containing adipic acid and about 44 percent nitric acid, wherein the product stream is diluted to a nitric acid concentration of about 38% for crystallizing coarse crystals of adipic acid product, and the resulting crystal slurry is centrifuged to give a mother liquor and a crystal cake, the improvement which comprises evaporating water from said mother liquor to produce a residue containing about 60% nitric acid, based on nitric acid and water, along with adipic acid and undesired by-products, chilling said residue to crystallize substantially all adipic acid, filtering the slurry resulting from said crystallization to produce a second filter cake and distilling from the filtrate a 60% nitric acid aqueous mixture substantially free of by-products.

3. A method according to claim 2 wherein the said second filter cake is combined with the oxidation product stream.

References Cited

UNITED STATES PATENTS

| | | | |
|---|---|---|---|
| 2,703,331 | 3/1955 | Goldbeck et al. | 260—533 |
| 2,191,786 | 2/1940 | Aronon | 260—531 |
| 3,102,908 | 9/1963 | Raynes | 260—531 X |
| 2,557,282 | 6/1951 | Hamblet et al. | 260—533 |

LORRAINE A. WEINBERGER, Primary Examiner

D. STENZEL, Assistant Examiner

U.S. Cl. X.R.

260—537